United States Patent
Toyama (10) Patent No.: US 11,060,931 B2
(45) Date of Patent: Jul. 13, 2021

(54) SENSOR DEVICE (71) Applicant: JTEKT CORPORATION, Osaka (JP)

(72) Inventor: Yuichi Toyama, Owariasahi (JP)

(73) Assignee: JTEKT CORPORATION, Osaka (JP)

(*) Notice: Subject to any disclaimer, the term of this patent is extended or adjusted under 35 U.S.C. 154(b) by 150 days.

(21) Appl. No.: 16/517,875

(22) Filed: Jul. 22, 2019

(65) Prior Publication Data
US 2020/0033209 A1 Jan. 30, 2020

(30) Foreign Application Priority Data

Jul. 27, 2018 (JP) .............................. JP2018-141438

(51) Int. Cl.
*G01L 3/10* (2006.01)
(52) U.S. Cl.
CPC .................................... *G01L 3/104* (2013.01)
(58) Field of Classification Search
CPC ................................ G01L 3/104; G01L 3/101
USPC ...................... 73/862.331–862.338, 862.325
See application file for complete search history.

(56) References Cited

U.S. PATENT DOCUMENTS

| 6,956,198 B2* | 10/2005 | Alsobrooks | B62D 15/022 |
| | | | 250/231.13 |
| 9,255,857 B2* | 2/2016 | Hotta | B62D 5/0481 |
| 9,772,239 B2* | 9/2017 | Matsui | G01L 3/104 |
| 10,683,032 B2* | 6/2020 | Toyama | B62D 3/123 |
| 2015/0033877 A1* | 2/2015 | Hotta | G01L 3/104 |
| | | | 73/862.193 |
| 2017/0315004 A1* | 11/2017 | Toyama | G01L 3/104 |
| 2018/0143092 A1 | 5/2018 | Hotta et al. | |
| 2020/0049577 A1* | 2/2020 | Tsuruo | H05K 5/065 |

FOREIGN PATENT DOCUMENTS

| EP | 3276317 A1 | 1/2018 |
| JP | 2015-031600 A | 2/2015 |

OTHER PUBLICATIONS

Jan. 7, 2020 Search Report issued in European Patent Application No. 19188080.6.

* cited by examiner

*Primary Examiner* — Octavia Hollington
(74) *Attorney, Agent, or Firm* — Oliff PLC (57) ABSTRACT

A sensor device that can reduce an assembly error of a magnetic sensor with respect to holders is provided. Magnetic sensors are disposed between first magnetism collection portions and second magnetism collection portions with a first holder and a second holder assembled to each other. A circuit board recessed portion of the second holder is provided with positioning protrusions that extend toward the first holder. A circuit board, on which the magnetic sensors are mounted, is provided with through holes. The magnetic sensors are integrally assembled to the second holder in advance with the positioning protrusions inserted through the through holes.

3 Claims, 4 Drawing Sheets

SENSOR DEVICE

INCORPORATION BY REFERENCE

The disclosure of Japanese Patent Application No. 2018-141438 filed on Jul. 27, 2018 including the specification, drawings and abstract, is incorporated herein by reference in its entirety.

BACKGROUND OF THE INVENTION

1. Field of the Invention

The present invention relates to a sensor device.

2. Description of the Related Art

There is known a torque sensor that detects torque applied to a rotary shaft as described in Japanese Patent Application Publication No. 2015-31600 (JP 2015-31600 A). The rotary shaft has an input shaft and an output shaft. The input shaft and the output shaft are connected to each other by a torsion bar.

The torque sensor has a permanent magnet fixed to the input shaft, a magnetic yoke fixed to the output shaft and disposed in a magnetic field formed by the permanent magnet, a pair of magnetism collection rings that guide magnetic flux from the magnetic yoke, and a magnetic sensor that generates a detection signal on the basis of the magnetic flux which is guided by the magnetism collection rings. The magnetism collection rings are held by respective holders. The magnetic sensor is disposed between the pair of holders.

In the torque sensor described in JP 2015-31600 A, the magnetic sensor is only disposed between the pair of holders, and the magnetic sensor is not fixed as positioned with respect to the holders. Thus, when assembling the torque sensor, an assembly error may be caused between the holders and the magnetic sensor. When an assembly error of the magnetic sensor with respect to the holders is caused, the detection precision of the magnetic sensor which detects magnetic flux that passes between the magnetism collection rings may be affected.

SUMMARY OF THE INVENTION

It is an object of the present invention to provide a sensor device that can reduce an assembly error of a magnetic sensor with respect to holders.

An aspect of the present invention provides a sensor device including: a permanent magnet attached to a first shaft and magnetized in a circumferential direction; a magnetic yoke that is fixed to a second shaft coupled to the first shaft via a coupling shaft and is disposed in a magnetic field formed by the permanent magnet; a first magnetism collection ring disposed so as to surround the magnetic yoke and configured to collect magnetic flux of the magnetic yoke; a first holder that holds the first magnetism collection ring; a second magnetism collection ring disposed side by side with the first magnetism collection ring in an axial direction of the second shaft, disposed so as to surround the magnetic yoke, and configured to collect the magnetic flux of the magnetic yoke; a second holder disposed side by side with the first holder in the axial direction and configured to hold the second magnetism collection ring; and a magnetic sensor that detects magnetic flux of a magnetic circuit formed by the permanent magnet, the magnetic yoke, the first magnetism collection ring, and the second magnetism collection ring. The magnetic sensor is disposed between the first magnetism collection ring and the second magnetism collection ring with the magnetic sensor integrally assembled to the second holder in advance.

With the configuration described above, positional displacement of the magnetic sensor with respect to the second holder is suppressed with the magnetic sensor integrally assembled to the second holder in advance. In this case, occurrence of an assembly error of the magnetic sensor with respect to the second holder is suppressed when assembling the sensor device. Therefore, the effect of the assembly error of the magnetic sensor with respect to the holders on the detection precision of the magnetic sensor is suppressed in accordance with an amount by which the assembly error of the magnetic sensor with respect to the second holder is reduced.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
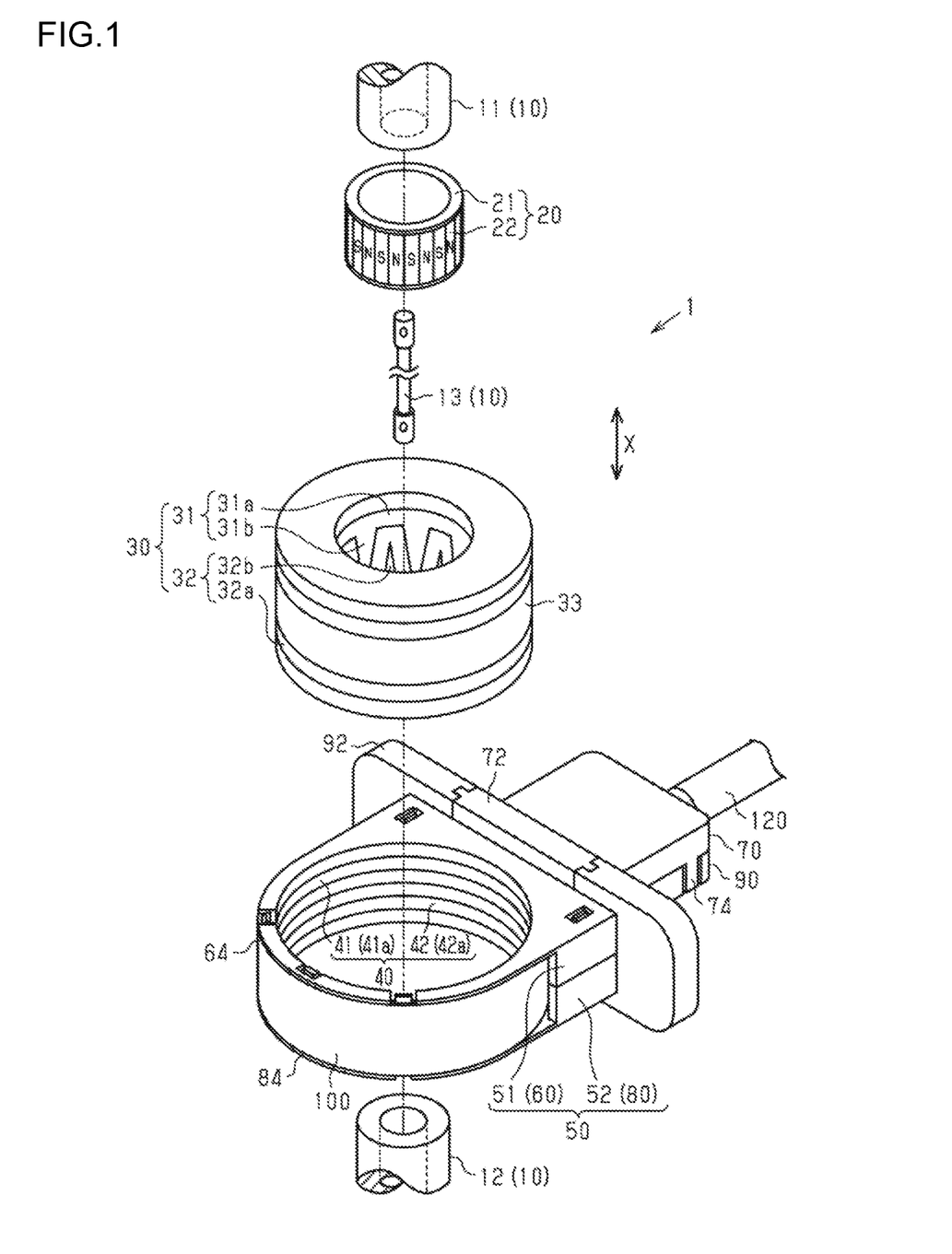
FIG. 1 is an exploded perspective view illustrating the configuration of a torque sensor.
Figure 2A:
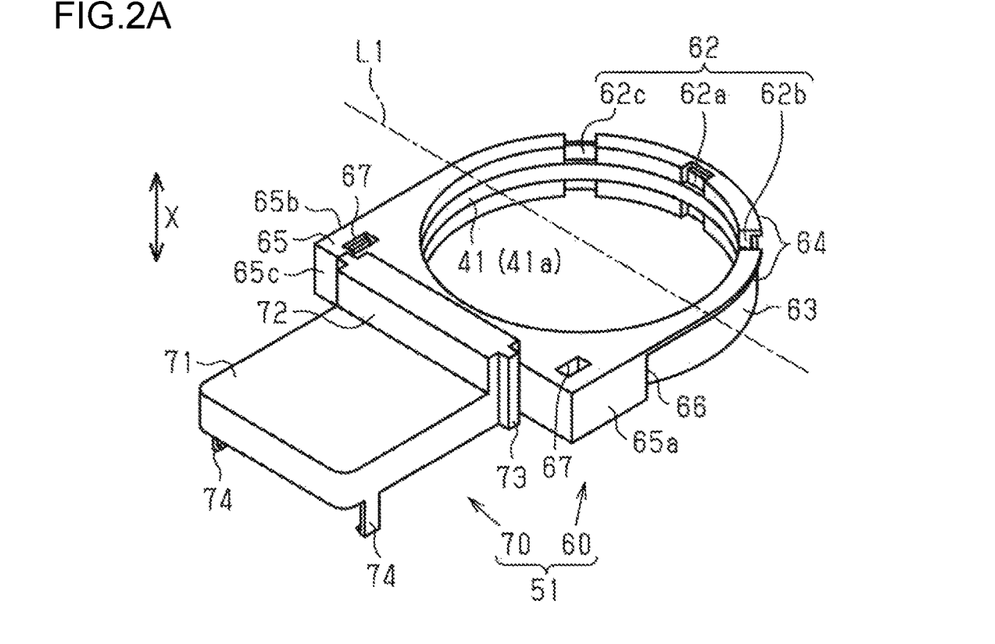
FIG. 2A is a perspective view of a first holder.
Figure 2B:
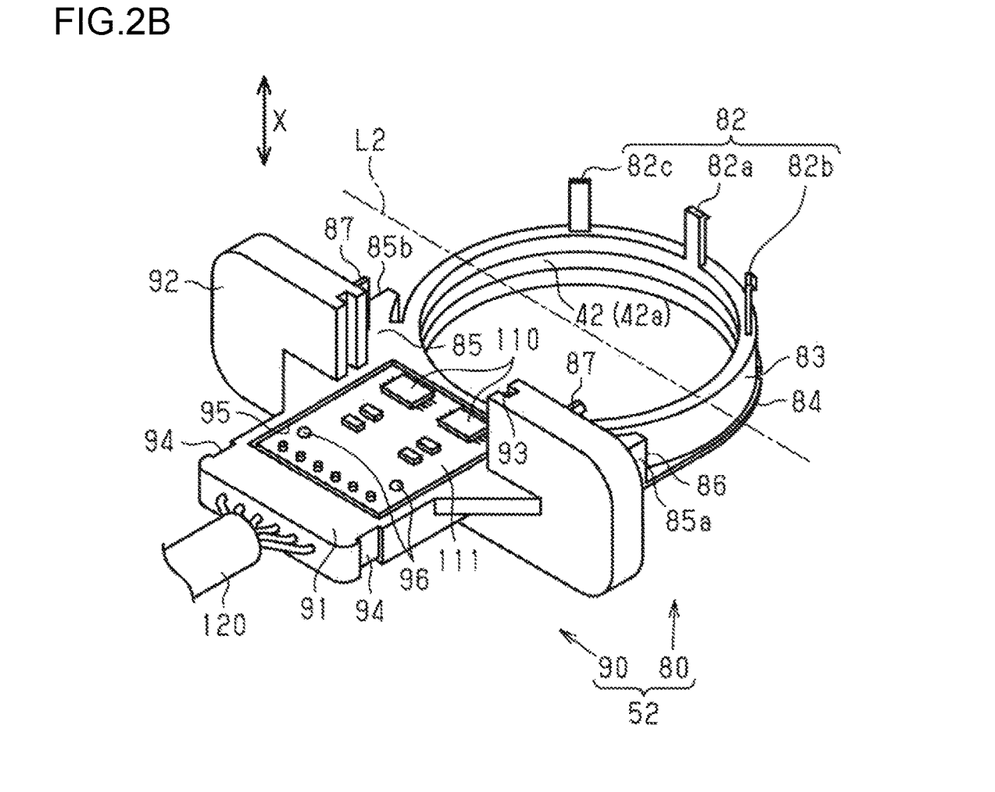
FIG. 2B is a perspective view of a second holder and a circuit board on which magnetic sensors are mounted.
Figure 3:
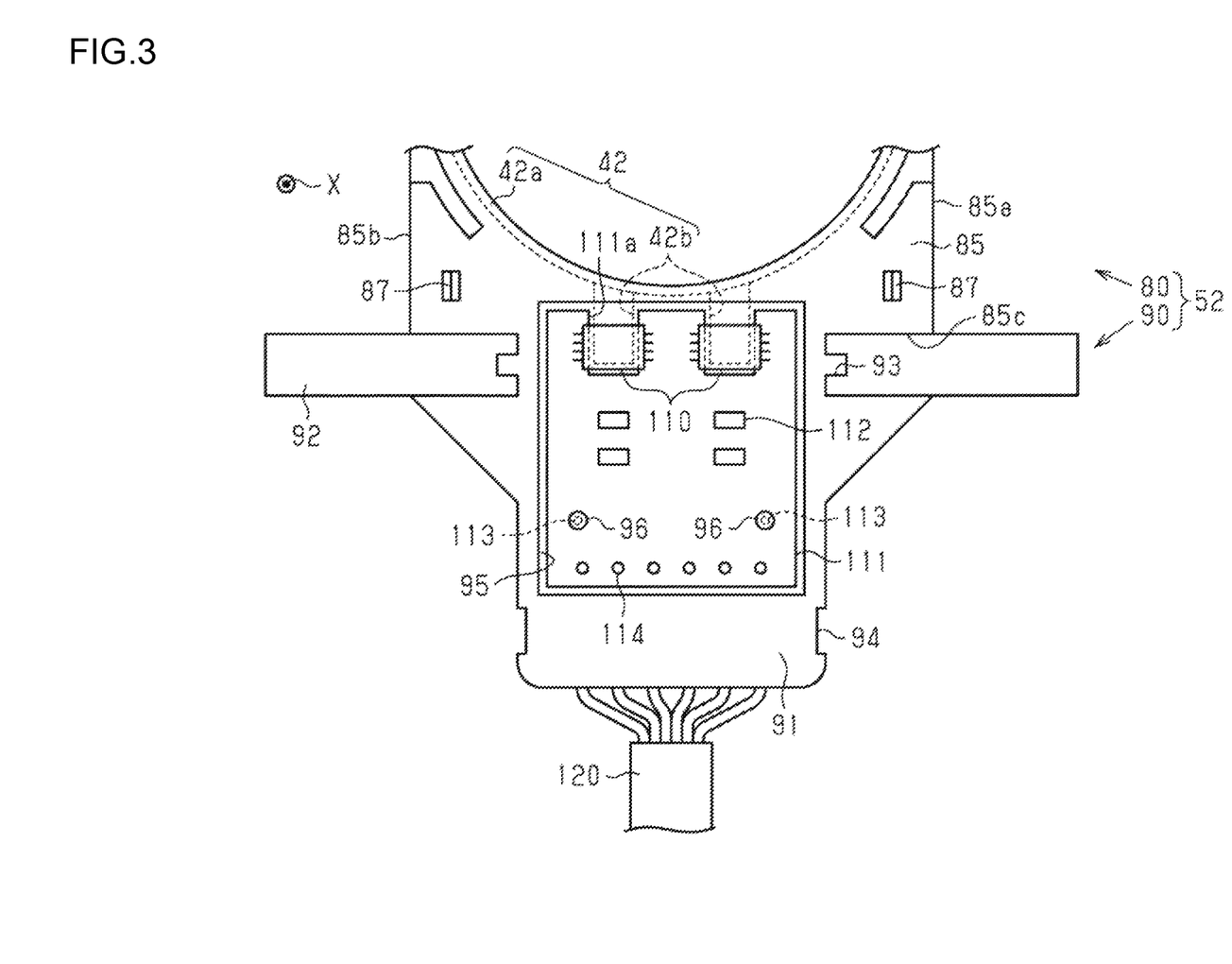
FIG. 3 is a view of the second holder and the circuit board on which the magnetic sensors are mounted when seen in the X direction.

A torque sensor according to an embodiment of the present invention will be described. As illustrated in FIGS. 1 to 3, a torque sensor 1 that serves as a sensor device detects torque applied to a rotary shaft 10 such as a steering shaft of an electric power steering system, for example, and includes a torsion bar 13, a cylindrical permanent magnet 20, a cylindrical magnetic yoke 30, a cylindrical magnetism collection ring 40 disposed so as to surround the magnetic yoke 30, a holder 50 that holds the magnetism collection ring 40, a magnetic shield 100 that covers the outer periphery of the holder 50, and magnetic sensors 110.

The rotary shaft 10 is composed of an input shaft 11, an output shaft 12, and the torsion bar 13. The torsion bar 13 that serves as a coupling shaft is disposed between the input shaft 11 serving as a first shaft and the output shaft 12 serving as a second shaft. The input shaft 11 and the output shaft 12 are coupled to each other on the same axis via the torsion bar 13.

The permanent magnet 20 is coupled to the input shaft 11. The permanent magnet 20 has a cylindrical holding portion 21 and a multipole magnet 22. The holding portion 21 is externally fitted with an end portion of the input shaft 11 on the output shaft 12 side. The holding portion 21 is attached so as to be rotatable together with the input shaft 11. The multipole magnet 22 is attached to the outer peripheral surface of the holding portion 21. The multipole magnet 22 is structured such that N and S magnetic poles are disposed alternately in the circumferential direction of the holding portion 21.

The magnetic yoke 30 is coupled to the output shaft 12. The magnetic yoke 30 has an annular first magnetic yoke 31 and an annular second magnetic yoke 32. The first magnetic yoke 31 and the second magnetic yoke 32 are disposed coaxially with the output shaft 12, and fixed so as to be rotatable together with the output shaft 12. The first magnetic yoke 31 and the second magnetic yoke 32 are disposed at the outer periphery of the multipole magnet 22 with a predetermined clearance therefrom so as to surround the multipole magnet 22. The first magnetic yoke 31 and the second magnetic yoke 32 are disposed in a magnetic field formed by the multipole magnet 22. The first magnetic yoke 31 and the second magnetic yoke 32 are disposed so as to face each other with a predetermined clearance therebetween in an axial direction X. The axial direction X is the axial direction of the output shaft 12, and is parallel to the axis of the input shaft 11 and the output shaft 12.

The first magnetic yoke 31 has a first annular portion 31a and a plurality of first lug portions 31b that extend toward the second magnetic yoke 32 from the inner peripheral surface of the first annular portion 31a. The first lug portions 31b are disposed at equal intervals in the circumferential direction on the inner peripheral surface of the first annular portion 31a. The second magnetic yoke 32 has a second annular portion 32a and a plurality of second lug portions 32b that extend toward the first magnetic yoke 31 from the inner peripheral surface of the second annular portion 32a. The second lug portions 32b are disposed at equal intervals in the circumferential direction on the inner peripheral surface of the second annular portion 32a. The first magnetic yoke 31 and the second magnetic yoke 32 are molded in a synthetic resin body 33 with the first lug portions 31b and the second lug portions 32b displaced from each other by a constant distance in the circumferential direction.

The inner peripheral surfaces of the first magnetic yoke 31 and the second magnetic yoke 32 are exposed from the synthetic resin body 33. The outer peripheral surfaces of the first annular portion 31a and the second annular portion 32a are exposed from the synthetic resin body 33. The first magnetic yoke 31 and the second magnetic yoke 32 are constituted of a magnetic material.

In a neutral state in which the torsion bar 13 between the input shaft 11 and the output shaft 12 is not twisted, the distal ends of the first lug portions 31b of the first magnetic yoke 31 and the distal ends of the second lug portions 32b of the second magnetic yoke 32 point to the boundary between the N poles and the S poles of the multipole magnet 22 of the permanent magnet 20.

The magnetism collection ring 40 has an annular first magnetism collection ring 41 that guides and collects magnetic flux of the first magnetic yoke 31, and an annular second magnetism collection ring 42 that guides and collects magnetic flux of the second magnetic yoke 32. The first magnetism collection ring 41 and the second magnetism collection ring 42 are disposed side by side with a predetermined clearance therebetween in the axial direction X. The first magnetism collection ring 41 and the second magnetism collection ring 42 are constituted of a magnetic material.

The first magnetism collection ring 41 has a first ring portion 41a disposed at the outer periphery of the first magnetic yoke 31 with a predetermined clearance therefrom so as to surround the first magnetic yoke 31, and first magnetism collection portions 41b that extend radially outward from the first ring portion 41a (see FIG. 3). In the present embodiment, the first magnetism collection ring 41 is provided with a pair of first magnetism collection portions 41b.

The second magnetism collection ring 42 has a second ring portion 42a disposed at the outer periphery of the second magnetic yoke 32 with a predetermined clearance therefrom so as to surround the second magnetic yoke 32, and second magnetism collection portions 42b that extend radially outward from the second ring portion 42a (see FIG. 3). In the present embodiment, the second magnetism collection ring 42 is provided with a pair of second magnetism collection portions 42b.

When the first magnetism collection ring 41 is disposed at the outer periphery of the first magnetic yoke 31 and the second magnetism collection ring 42 is disposed at the outer periphery of the second magnetic yoke 32, the first magnetism collection portions 41b and the second magnetism collection portions 42b are disposed so as to face each other with a predetermined clearance therebetween in the axial direction X.

The holder 50 has a first holder 51 that holds the first magnetism collection ring 41, and a second holder 52 that holds the second magnetism collection ring 42. The first holder 51 and the second holder 52 are disposed side by side in the axial direction X. The holder 50 is constituted by assembling the first holder 51 and the second holder 52 to each other.

The first holder 51 has a first ring portion holder 60 that surrounds and holds the first ring portion 41a, and a first magnetism collection portion holder 70 that surrounds and holds the first magnetism collection portions 41b. The first magnetism collection portion holder 70 extends radially outward from the first ring portion holder 60. The first ring portion holder 60 and the first magnetism collection portion holder 70 are molded integrally with each other. The first ring portion holder 60 and the first magnetism collection portion holder 70 are constituted of a synthetic resin.

The first ring portion holder 60 has a generally cylindrical shape so as to surround the first ring portion 41a. A first ring portion recessed portion to be fitted with the first ring portion 41a is formed to be recessed over the entire circumference in the inner peripheral surface of the first ring portion holder 60. The first ring portion recessed portion is provided at an intermediate portion, in the axial direction X, of the inner peripheral surface of the first ring portion holder 60. Three first fitting recessed portions 62 are provided in the inner peripheral surface of the first ring portion holder 60.

The first fitting recessed portions 62 are formed to be recessed over the entire region, in the axial direction, of the first ring portion holder 60. The amount of recess of the first fitting recessed portions 62 is set to be larger than the amount of recess of the first ring portion recessed portion. The first fitting recessed portions 62 include a middle recessed portion 62a, a first side recessed portion 62b, and a second side recessed portion 62c. The middle recessed portion 62a is provided at a position on the opposite side from the first magnetism collection portion holder 70 in the circumferential direction of the first ring portion holder 60. The first side recessed portion 62b is provided in the inner peripheral surface of the first ring portion holder 60 at a position a predetermined distance toward a first side (right side in FIG. 2A) in the circumferential direction from the middle recessed portion 62a. The second side recessed portion 62c is provided in the inner peripheral surface of the first ring portion holder 60 at a position a predetermined distance toward a second side (left side in FIG. 2A) in the circumferential direction from the middle recessed portion 62a. The first side recessed portion 62b and the second side recessed portion 62c are provided at the same distance, in the circumferential direction, from the middle recessed portion 62a.

The first ring portion holder 60 has a first circumferential surface portion 63, the outer side surface of which has a circumferential surface shape and which is provided on the opposite side from the first magnetism collection portion holder 70 with respect to a first virtual horizontal line L1 that extends in a direction that is orthogonal to the direction in which the first magnetism collection portion holder 70 extends and that passes through the center of the inner circumferential region of the first ring portion holder 60. A first flange portion 64 that projects radially outward is provided on the outer side surface of the first circumferential surface portion 63. The first flange portion 64 is provided at a portion of the outer side surface of the first circumferential surface portion 63 on the opposite side from the second holder 52. The first ring portion holder 60 has a first planar surface portion 65, the outer side surfaces of which include three planar surfaces and which is formed to be wider in the radial direction than the first circumferential surface portion 63.

The first planar surface portion 65 is provided at a portion of the first ring portion holder 60 on the first magnetism collection portion holder 70 side with respect to the first virtual horizontal line L1. The outer side surfaces of the first planar surface portion 65 include two planar surfaces 65a and 65b that extend along the direction in which the first magnetism collection portion holder 70 extends, and a planar surface 65c that extends along a line that extends in parallel with the first virtual horizontal line L1. The planar surfaces 65a and 65b are provided with a first recess 66. The first planar surface portion 65 is provided with a pair of second fitting recessed portions 67 formed in a rectangular shape when seen in the axial direction X to penetrate the first planar surface portion 65.

The first magnetism collection portion holder 70 has a rectangular plate shape. The first magnetism collection portion holder 70 is connected to a portion of the outer peripheral surface of the first ring portion holder 60 on the second holder 52 side. The first magnetism collection portion holder 70 has a first circuit board housing portion 71 and a wall portion 72. A surface of the first circuit board housing portion 71 on the second holder 52 side functions as an abutment surface against which the magnetic sensors 110 abut. A surface of the first magnetism collection portion holder 70 on the second holder 52 side is positioned to be flush with a surface of the first ring portion holder 60 on the second holder 52 side. The thickness, in the axial direction X, of the first circuit board housing portion 71 of the first magnetism collection portion holder 70 is set to be smaller than the thickness, in the axial direction X, of the first ring portion holder 60.

The first circuit board housing portion 71, to which the wall portion 72 is connected, is connected to the first planar surface portion 65 of the first ring portion holder 60. The wall portion 72 has a rectangular plate shape. The length, in the axial direction X, of the wall portion 72 is set to be longer than the length, in the axial direction X, of the first ring portion holder 60. Projecting streaks 73 are provided on end surfaces of the wall portion 72 positioned in a direction that is parallel to the first virtual horizontal line L1. The projecting streaks 73 extend in the axial direction X. The projecting streaks 73 are provided at an intermediate position, in the direction in which the first magnetism collection portion holder 70 extends, of the end surfaces on which the projecting streaks 73 are provided. The first circuit board housing portion 71 has third fitting projecting portions 74. The third fitting projecting portions 74 are provided on the distal end side of the first circuit board housing portion 71 (first magnetism collection portion holder 70) to extend toward the second holder 52 from a surface of the first circuit board housing portion 71 on the second holder 52 side. The third fitting projecting portions 74 serve as engagement lugs for snap fitting.

The second holder 52 has a second ring portion holder 80 that surrounds and holds the second ring portion 42a, and a second magnetism collection portion holder 90 that surrounds and holds the second magnetism collection portions 42b. The second magnetism collection portion holder 90 extends radially outward from the second ring portion holder 80. The second ring portion holder 80 and the second magnetism collection portion holder 90 are molded integrally with each other. The second ring portion holder 80 and the second magnetism collection portion holder 90 are constituted of a synthetic resin.

The second ring portion holder 80 has a generally cylindrical shape so as to surround the second magnetism collection ring 42. A second ring portion recessed portion to be fitted with the second ring portion 42a is formed to be recessed over the entire circumference in the inner peripheral surface of the second ring portion holder 80. The second ring portion recessed portion is provided at an intermediate portion, in the axial direction X, of the inner peripheral surface of the second ring portion holder 80. Three first fitting projecting portions 82 are provided on the second ring portion holder 80. The first fitting projecting portions 82 project toward the first holder 51 from a surface of the second ring portion holder 80 on the first holder 51 side.

The first fitting projecting portions 82 include a middle projecting portion 82a, a first side projecting portion 82b, and a second side projecting portion 82c. The middle projecting portion 82a is provided at a position on the opposite side from the second magnetism collection portion holder 90 in the circumferential direction of the second ring portion holder 80. The first side projecting portion 82b is provided at a position a predetermined distance toward a first side (right side in FIG. 2B) in the circumferential direction of the second ring portion holder 80 from the middle projecting portion 82a. The second side projecting portion 82c is provided at a position a predetermined distance toward a second side (left side in FIG. 2B) in the circumferential direction of the second ring portion holder 80 from the middle projecting portion 82a. The first side projecting portion 82b and the second side projecting portion 82c are provided at the same distance, in the circumferential direction, from the middle projecting portion 82a.

The second ring portion holder 80 has a second circumferential surface portion 83, the outer side surface of which has a circumferential surface shape and which is provided on the opposite side from the second magnetism collection portion holder 90 with respect to a second virtual horizontal line L2 that extends in a direction that is orthogonal to the direction in which the second magnetism collection portion holder 90 extends and that passes through the center of the inner circumferential region of the second ring portion holder 80. A second flange portion 84 that projects radially outward is provided on the outer side surface of the second circumferential surface portion 83. The second flange portion 84 is positioned at a portion of the outer side surface of the second circumferential surface portion 83 on the opposite side from the first holder 51.

The second ring portion holder 80 has a second planar surface portion 85, the outer side surfaces of which include three planar surfaces and which is formed to be wider in the radial direction than the second circumferential surface portion 83. The second planar surface portion 85 is provided at a portion of the second ring portion holder 80 on the second magnetism collection portion holder 90 side with respect to the second virtual horizontal line L2. The outer side surfaces of the second planar surface portion 85 include two planar surfaces 85a and 85b that extend along the direction in which the second magnetism collection portion holder 90 extends, and a planar surface 85c that extends along a line that extends in parallel with the second virtual horizontal line L2. The planar surfaces 85a and 85b are provided with a pair of second recesses 86. Second fitting projecting portions 87 that project toward the first holder 51 are provided on a surface of the second planar surface portion 85 on the first holder 51 side. The second fitting projecting portions 87 serve as engagement lugs for snap fitting.

The magnetic shield 100 is disposed on the outer circumferential side of the first ring portion holder 60 and the second ring portion holder 80 with the first holder 51 and the second holder 52 assembled to each other. The magnetic shield 100 is formed in a C-shape in cross-section. A material that can block magnetism such as metal, for example, is adopted for the magnetic shield 100. The magnetic shield 100 abuts against the first flange portion 64 of the first ring portion holder 60 and the second flange portion 84 of the second ring portion holder 80 in the axial direction X. Both end portions, in the circumferential direction, of the magnetic shield 100 are inserted into the first recess 66 and the second recess 86 to be fixed.

The second magnetism collection portion holder 90 has a rectangular plate shape. The second magnetism collection portion holder 90 is connected to the outer peripheral surface of the second ring portion holder 80. The second magnetism collection portion holder 90 is disposed so as to face the first holder 51 in the axial direction X. A surface of the second magnetism collection portion holder 90 on the opposite side from the first holder 51 is positioned to be flush with a surface of the second ring portion holder 80 on the opposite side from the first holder 51.

The second magnetism collection portion holder 90 has a second circuit board housing portion 91 and flange portions 92. The flange portions 92 are provided on end surfaces of the second circuit board housing portion 91 in a direction that is parallel to the second virtual horizontal line L2. The flange portions 92 extend in a direction that is parallel to the second virtual horizontal line L2. The flange portions 92 extend toward the first holder 51 with respect to a surface of the second circuit board housing portion 91 on the first holder 51 side. The length, in the axial direction X, of the flange portions 92 is set to be longer than the length, in the axial direction X, of the second circuit board housing portion 91. Recessed streaks 93 that extend in the axial direction X are provided in surfaces of the flange portions 92 on the second circuit board housing portion side 91. The recessed streaks 93 are provided at an intermediate position, in the direction in which the second magnetism collection portion holder 90 extends, of the surfaces in which the recessed streaks 93 are provided. The amount of recess of the recessed streaks 93 is set to be about the same as the amount of projection of the projecting streaks 73.

The second circuit board housing portion 91 has third fitting recessed portions 94 to be fitted with the third fitting projecting portions 74. The third fitting recessed portions 94 are positioned on the distal end side of the second circuit board housing portion 91, and extend in the axial direction X. The thickness, in the axial direction X, of the second circuit board housing portion 91 of the second magnetism collection portion holder 90 is set to be about the same as the thickness, in the axial direction X, of a portion of the second ring portion holder 80 at which the first fitting projecting portions 82 and the second fitting projecting portions 87 are not provided.

A circuit board recessed portion 95, in which a circuit board 111 is to be disposed, is provided in a surface of the second planar surface portion 85 of the second ring portion holder 80 on the first holder 51 side and a surface of the second circuit board housing portion 91 on the first holder 51 side. The circuit board recessed portion 95 is formed to extend between the second planar surface portion 85 and the second circuit board housing portion 91. The circuit board recessed portion 95 is formed in a rectangular shape when seen in the axial direction X. The first circuit board housing portion 71, the second circuit board housing portion 91, a portion of the second planar surface portion 85 of the second ring portion holder 80 in which the circuit board recessed portion 95 is provided, and a portion of the first planar surface portion 65 of the first ring portion holder 60 that faces the circuit board recessed portion 95 in the axial direction X function as a portion that houses the magnetic sensors 110. That is, the third fitting projecting portions 74 and the third fitting recessed portions 94 are provided on the outer wall surface of the portion that houses the magnetic sensors 110. The circuit board recessed portion 95 is provided with positioning protrusions 96 that extend toward the first holder 51 from a surface of the circuit board recessed portion 95 on the first holder 51 side. A pair of positioning protrusions 96 are provided on the circuit board recessed portion 95. The positioning protrusions 96 are disposed side by side in a direction that is parallel to the second virtual horizontal line L2.

The circuit board 111 which serves as a circuit portion has a rectangular plate shape. The magnetic sensors 110 are mounted on a surface of the circuit board 111 on the first holder 51 side. The magnetic sensors 110 each have a rectangular parallelepiped shape. In the present embodiment, a pair of the magnetic sensors 110 are provided. The magnetic sensors 110 are provided at an end portion of the circuit board 111 on the second ring portion holder 80 side. The magnetic sensors 110 are disposed side by side in a direction that is parallel to the second virtual horizontal line L2. Notches 111a are provided at an end portion of the circuit board 111 on the second ring portion holder 80 side. The notches 111a penetrate the circuit board 111 in the axial direction X. The notches 111a are provided side by side in a direction that is parallel to the second virtual horizontal line L2. The magnetic sensors 110 are disposed at positions overlapping the notches 111a so as to extend over the notches 111a when seen in the axial direction X. The second magnetism collection portions 42b of the second magnetism collection ring 42 are disposed in the notches 111a. The magnetic sensors 110 are disposed between the first magnetism collection portions 41b and the second magnetism collection portions 42b with the first holder 51 and the second holder 52 assembled to each other. When seen in the direction in which the second magnetism collection portion holder 90 extends, the middle projecting portion 82a of the first fitting projecting portions 82 is positioned between the magnetic sensors 110. The recessed streaks 93 of the flange portions 92 are positioned on the distal end side of the second magnetism collection portion holder 90 with respect to the magnetic sensors 110 which are mounted on the circuit board 111. The third fitting recessed portions 94 are positioned on the distal end side of the second magnetism collection portion holder 90 with respect to an end portion of the circuit board 111 on the distal end side of the second magnetism collection portion holder 90.

The magnetic sensors 110 detect magnetic flux of a magnetic circuit constituted by the permanent magnet 20, the first magnetic yoke 31, the second magnetic yoke 32, the first magnetism collection ring 41, and the second magnetism collection ring 42. The magnetic sensors 110 include a built-in magnetism detection element such as a Hall element, for example. The magnetic sensors 110 generate a voltage value that matches the intensity of applied magnetism as a detection signal. The magnetic sensors 110 are connected to a signal wire 120. The magnetic sensors 110 output a detection signal through the signal wire 120.

The magnetic sensors 110, various types of electronic components 112, through holes 113, and connection portions 114 are disposed on a surface of the circuit board 111 on the first holder 51 side in the order from the side of the second ring portion holder 80 toward the distal end of the second magnetism collection portion holder 90. The various types of electronic components 112 execute various types of processing for the magnetic sensors 110 to generate a detection signal. The connection portions 114 connect between the signal wire 120 for connection to an external device and the electronic components 112. The connection portions 114 are soldered portions, for example.

No electronic components are mounted on a portion of the circuit board 111 between the electronic components 112 and the connection portions 114. The through holes 113 are formed in this portion. The through holes 113 extend in the axial direction X. A pair of the through holes 113 are formed in the circuit board 111. The through holes 113 are disposed side by side in a direction that is parallel to the second virtual horizontal line L2. The positioning protrusions 96 that are provided on the circuit board recessed portion 95 are inserted through the through holes 113. The through holes 113 are provided on the outer side with respect to the magnetic sensors 110 in a direction that is parallel to the second virtual horizontal line L2.

Figure 4A:
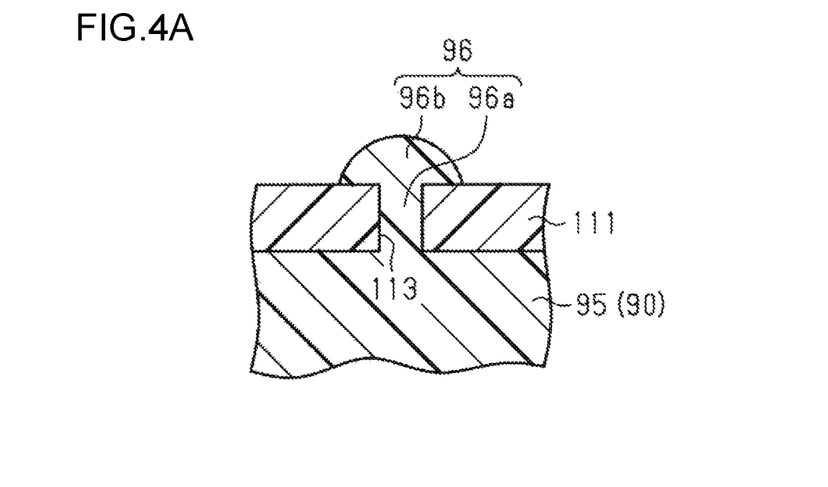
FIG. 4A is a schematic sectional view illustrating a positioning protrusion.

As illustrated in FIG. 4A, the positioning protrusion 96 has a shaft portion 96a that extends toward the first magnetism collection portion holder 70 with the circuit board 111 assembled to the second magnetism collection portion holder 90, and a head portion 96b provided at the distal end portion of the shaft portion 96a. The shaft portion 96a has a circular column shape. The shaft portion 96a is inserted through the through hole 113. The head portion 96b has a hemispherical shape. The outer peripheral surface of the head portion 96b is increased in diameter compared to the shaft portion 96a. The head portion 96b has a round shape when seen in the axial direction X. The outside diameter of the head portion 96b is set to be larger than the inside diameter of the through hole 113. The positioning protrusion 96 is formed by heat staking. The bottom surface of the head portion 96b abuts against a surface of the circuit board 111 on the first magnetism collection portion holder 70 side.

Figure 4B:
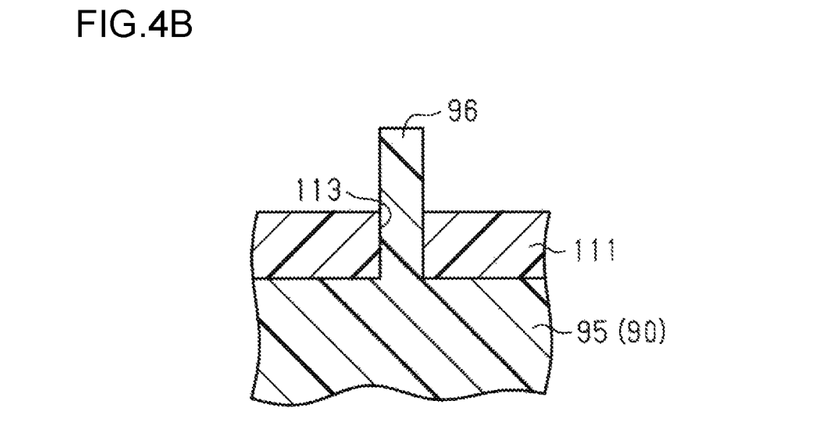
FIG. 4B is a schematic sectional view illustrating the positioning protrusion.

As illustrated in FIG. 4B, the head portion 96b of the positioning protrusion 96 is not formed before the circuit board 111 is assembled to the second magnetism collection portion holder 90, that is, when the positioning protrusion 96 is only inserted through the through hole 113 which is provided in the circuit board 111. The head portion 96b is formed by applying heat staking to the distal end of the positioning protrusion 96 after the positioning protrusion 96 is inserted through the through hole 113 provided in the circuit board 111. Consequently, the circuit board 111 is integrally assembled to the second magnetism collection portion holder 90.

As illustrated in FIGS. 1 to 3, the first holder 51 and the second holder 52 are assembled to each other with the circuit board 111, on which the magnetic sensors 110 are mounted, interposed therebetween. When assembling the first holder 51 and the second holder 52 to each other, the circuit board 111 has been integrally assembled to the second holder 52 in advance. Specifically, the circuit board 111 is integrally assembled to the second holder 52 in advance during a period since the first holder 51 and the second holder 52 are molded until the first holder 51 is assembled to the second holder 52. After that, the projecting streaks 73 of the first magnetism collection portion holder 70 are fitted with the recessed streaks 93 of the second magnetism collection portion holder 90. The first fitting projecting portions 82 of the second ring portion holder 80 are fitted with the first fitting recessed portions 62 of the first ring portion holder 60. The second fitting projecting portions 87 of the second ring portion holder 80 are fitted with the second fitting recessed portions 67 of the first ring portion holder 60. The third fitting projecting portions 74 of the first magnetism collection portion holder 70 are fitted with the third fitting recessed portions 94 of the second magnetism collection portion holder 90. Consequently, the first holder 51 is completely assembled to the second holder 52.

In the thus configured torque sensor 1, when the rotary shaft 10 is rotationally operated, for example, to cause relative rotational displacement between the input shaft 11 and the output shaft 12, the positional relationship between the permanent magnet 20 and the first magnetic yoke 31 and the second magnetic yoke 32 is varied, and therefore magnetism collected by the first magnetic yoke 31 and the second magnetic yoke 32 is varied. Consequently, magnetic flux that passes between the first magnetism collection portions 41b and the second magnetism collection portions 42b is varied, and therefore the intensity of magnetism applied to the magnetic sensors 110 is varied. The intensity of magnetism applied to the magnetic sensors 110 is varied in accordance with the torsional angle of the torsion bar 13. Thus, the torsional angle of the torsion bar 13 can be computed on the basis of a detection signal output from the magnetic sensors 110, and therefore torque applied to the rotary shaft 10 can be computed on the basis of the torsional angle of the torsion bar 13.

The functions and the effects of the present embodiment will be described.

(1) Positional displacement of the magnetic sensors 110 with respect to the second holder 52 is suppressed with the magnetic sensors 110, which are mounted on the circuit board 111, integrally assembled to the second magnetism collection portion holder 90 of the second holder 52 in advance. In this case, the assembly error of the magnetic sensors 110 with respect to the second holder 52 is reduced when assembling the torque sensor 1. Therefore, the effect of the assembly error of the magnetic sensors 110 with respect to the first holder 51 and the second holder 52 on the detection precision of the magnetic sensors 110 is suppressed in accordance with an amount by which the assembly error of the magnetic sensors 110 with respect to the second holder 52 is suppressed.

(2) The circuit board 111 is positioned with respect to the second magnetism collection portion holder 90 with the positioning protrusions 96, which are provided on the second magnetism collection portion holder 90, inserted through the through holes 113 provided in the circuit board 111. That is, when the circuit board 111 is to be moved in a direction that is orthogonal to the axial direction X, the through holes 113 of the circuit board 111 abut against the positioning protrusions 96. Consequently, positional displacement of the circuit board 111 with respect to the second magnetism collection portion holder 90 in a direction that is orthogonal to the plate thickness direction of the circuit board 111 is regulated with the positioning protrusions 96 inserted through the through holes 113. Thus, an assembly error in a direction that is orthogonal to the plate thickness direction of the circuit board 111 can be reduced, and therefore the assembly error of the magnetic sensors 110, which are mounted on the circuit board 111, with respect to the second holder 52 can be reduced.

(3) Positional displacement of the circuit board 111 with respect to the second holder 52 in the plate thickness direction is regulated with a surface of the circuit board 111, on which the magnetic sensors 110 are mounted, on the first magnetism collection portion holder 70 side abutting against the head portions 96b of the positioning protrusions 96. Thus, the assembly error of the circuit board 111 with respect to the second holder 52 in the plate thickness direction of the circuit board 111 can be reduced, and therefore the assembly error of the magnetic sensors 110, which are mounted on the circuit board 111, with respect to the second holder 52 can be reduced.

(4) A comparative example will be described regarding a case where fitting projecting portions for assembling the first magnetism collection portion holder 70 that is a portion of the first holder 51 housing the magnetic sensors 110 and the second magnetism collection portion holder 90 that is a portion of the second holder 52 housing the magnetic sensors 110 to each other are provided on the second magnetism collection portion holder 90. When fitting the fitting projecting portions with fitting recessed portions, the fitting projecting portions are mainly deformed. Thus, a deformation force caused along with fitting is applied to the second magnetism collection portion holder 90 provided with the fitting projecting portions. Thus, when the second magnetism collection portion holder 90 is deformed, an assembly error of the circuit board 111 integrally assembled to the second magnetism collection portion holder 90, may be caused. In the present embodiment, the third fitting projecting portions 74 for assembling the first magnetism collection portion holder 70 and the second magnetism collection portion holder 90 to each other are provided on the first magnetism collection portion holder 70, rather than the second magnetism collection portion holder 90 to which the magnetic sensors 110 are integrally assembled. When fitting the third fitting projecting portions 74 with the third fitting recessed portions 94, the third fitting projecting portions 74 are mainly deformed to be fitted with the third fitting recessed portions 94. Thus, when fitting the third fitting projecting portions 74 with the third fitting recessed portions 94, application of a deformation force caused along with fitting to the second magnetism collection portion holder 90, to which the circuit board 111 on which the magnetic sensors 110 are mounted is integrally assembled, is suppressed compared to the first magnetism collection portion holder 70 provided with the third fitting projecting portions 74. By suppressing application of such a deformation force, occurrence of the assembly error of the magnetic sensors 110 with respect to the second holder 52 can be suppressed.

(5) The first fitting projecting portions 82 and the second fitting projecting portions 87 for assembling the first ring portion holder 60 and the second ring portion holder 80 to each other are provided on the second ring portion holder 80, and the third fitting projecting portions 74 for assembling the first magnetism collection portion holder 70 and the second magnetism collection portion holder 90 to each other are provided on the first magnetism collection portion holder 70. Since the first fitting projecting portions 82 and the second fitting projecting portions 87, and the third fitting projecting portions 74 are disposed on different holders, deformation forces caused along with fitting between the fitting projecting portions and the fitting recessed portions can be distributed to the holders.

(6) In a comparative example in which the second magnetism collection portion holder 90 is provided with only one positioning protrusion 96, the circuit board 111 may be rotated about the positioning protrusion 96 inserted through the through hole 113. In the present embodiment, in this respect, the circuit board recessed portion 95 of the second magnetism collection portion holder 90 is provided with two positioning protrusions 96 arranged side by side in a direction that is parallel to the second virtual horizontal line L2. Thus, rotation of the circuit board 111 with respect to the second magnetism collection portion holder 90 is regulated.

(7) The magnetic sensors 110 are disposed on the circuit board 111 away from the through holes 113 in consideration of the fact that the positioning protrusions 96 which are inserted through the through holes 113 are to be heat staked. Consequently, heat is not easily transmitted to the magnetic sensors 110 even in the case where the positioning protrusions 96 are heat staked.

The present embodiment may be modified as follows. The following other embodiments may be combined with each other as long as the embodiments do not technically contradict with each other. Only one first fitting projecting portion 82 may be provided, and two or more first fitting projecting portions 82 may be provided. Correspondingly, only one first fitting recessed portion 62 may be provided, and two or more first fitting recessed portions 62 may be provided. Only one second fitting projecting portion 87 and second fitting recessed portion 67 may be provided, and two or more second fitting projecting portions 87 and second fitting recessed portions 67 may be provided. Only one third fitting projecting portion 74 and third fitting recessed portion 94 may be provided, and two or more third fitting projecting portions 74 and third fitting recessed portions 94 may be provided.

The first fitting projecting portions 82 and the second fitting projecting portions 87 for assembling the first ring portion holder 60 and the second ring portion holder 80 to each other may be provided on the first ring portion holder 60, and the third fitting projecting portions 74 for assembling the first magnetism collection portion holder 70 and the second magnetism collection portion holder 90 to each other may be provided on the second magnetism collection portion holder 90.

The first fitting projecting portions 82 and the second fitting projecting portions 87 for assembling the first ring portion holder 60 and the second ring portion holder 80 to each other may be provided on the first ring portion holder 60, and the third fitting projecting portions 74 for assembling the first magnetism collection portion holder 70 and the second magnetism collection portion holder 90 to each other may be provided on the first magnetism collection portion holder 70. The first fitting projecting portions 82 and the second fitting projecting portions 87 may be provided on the second ring portion holder 80, and the third fitting projecting portions 74 may be provided on the second magnetism collection portion holder 90.

The third fitting projecting portions 74 may be provided on the second magnetism collection portion holder 90. While two positioning protrusions 96 are provided on the circuit board recessed portion 95 of the second magnetism collection portion holder 90, only one positioning protrusion 96 may be provided. Alternatively, three or more positioning protrusions 96 may be provided.

While the positioning protrusion 96 is formed with the head portion 96*b*, the head portion 96*b* may not be formed. That is, it is only necessary that the positioning protrusion 96 should include at least the shaft portion 96*a*. A process of forming the head portion 96*b* by heat staking the distal end of the positioning protrusion 96 may be omitted.

The cross-sectional shape of the shaft portion 96*a* when seen in the axial direction X is not limited to a circular shape, and may be a polygonal shape. The positioning protrusions 96 may be provided on the first magnetism collection portion holder 70. That is, the circuit board 111, on which the magnetic sensors 110 are mounted, may be integrally assembled to the first holder 51.

The positioning protrusions 96 are provided to integrally assemble the circuit board 111, on which the magnetic sensors 110 are mounted, to the second holder 52. However, the positioning protrusions 96 may not be provided. For example, the circuit board 111, on which the magnetic sensors 110 are mounted, may be integrally assembled to the second holder 52 by a different fastening unit such as a screw. That is, the circuit board 111, on which the magnetic sensors 110 are mounted, may be integrally assembled to the second holder 52 by any method.

Only one magnetic sensor 110 may be mounted on the circuit board 111. In this case, the first magnetism collection ring 41 may be provided with only one first magnetism collection portion 41*b*, and the second magnetism collection ring 42 may be provided with only one second magnetism collection portion 42*b*. Alternatively, three or more magnetic sensors 110 may be mounted on the circuit board 111. In this case, the first magnetism collection ring 41 may be provided with three or more first magnetism collection portions 41*b*, and the second magnetism collection ring 42 may be provided with three or more second magnetism collection portions 42*b*.

The magnetic sensors 110 may be assembled to the circuit board recessed portion 95, and disposed between the first magnetism collection portions 41*b* and the second magnetism collection portion 42*b*. The magnetic sensors 110 may be connected to a terminal (connection terminal). In this case, conductor portions of the terminal may be provided with through holes, and the distal ends of the positioning protrusions 96 may be heat staked with the positioning protrusions 96 inserted through the through holes.

While hall elements are adopted as the magnetic sensors 110, magnetoresistance elements may be adopted instead. While the sensor device is embodied as the torque sensor 1 that detects torque, the sensor device may be embodied as a rotational angle detection device that detects the rotational angle of the rotary shaft 10, for example.

What is claimed is:

1. A sensor device comprising:
   a permanent magnet attached to a first shaft and magnetized in a circumferential direction;
   a magnetic yoke that is fixed to a second shaft coupled to the first shaft via a coupling shaft and is disposed in a magnetic field formed by the permanent magnet;
   a first magnetism collection ring disposed so as to surround the magnetic yoke and configured to collect magnetic flux of the magnetic yoke;
   a first holder that holds the first magnetism collection ring;
   a second magnetism collection ring disposed side by side with the first magnetism collection ring in an axial direction of the second shaft, disposed so as to surround the magnetic yoke, and configured to collect the magnetic flux of the magnetic yoke;
   a second holder disposed side by side with the first holder in the axial direction and configured to hold the second magnetism collection ring; and
   a magnetic sensor that detects magnetic flux of a magnetic circuit formed by the permanent magnet, the magnetic yoke, the first magnetism collection ring, and the second magnetism collection ring, wherein:
   the magnetic sensor is disposed between the first magnetism collection ring and the second magnetism collection ring with the magnetic sensor integrally assembled to the second holder in advance;
   the magnetic sensor is mounted on a circuit portion;
   the circuit portion is provided with a through hole that penetrates the circuit portion in a plate thickness direction;
   the second holder is provided with a positioning protrusion that extends toward the first holder; and
   the positioning protrusion provided on the second holder is inserted through the through hole of the circuit portion.

2. The sensor device according to claim 1, wherein:
   the positioning protrusion has a shaft portion that extends toward the first holder, and a head portion provided at a distal end portion of the shaft portion and increased in diameter compared to the shaft portion; and
   the head portion abuts against a surface of the circuit portion on a first holder side.

3. The sensor device according to claim 1, wherein:
   a fitting projecting portion that extends toward the second holder is provided on an outer wall surface of a portion of the first holder that houses the magnetic sensor; and
   a fitting recessed portion to be fitted with the fitting projecting portion is provided in an outer wall surface of a portion of the second holder that houses the magnetic sensor.

* * * * *